March 24, 1925.
W. A. HARVEY
1,530,828
HOUSING FOR RECEPTACLES FOR SURFACE MOUNTING
Filed Dec. 8, 1922    2 Sheets-Sheet 1
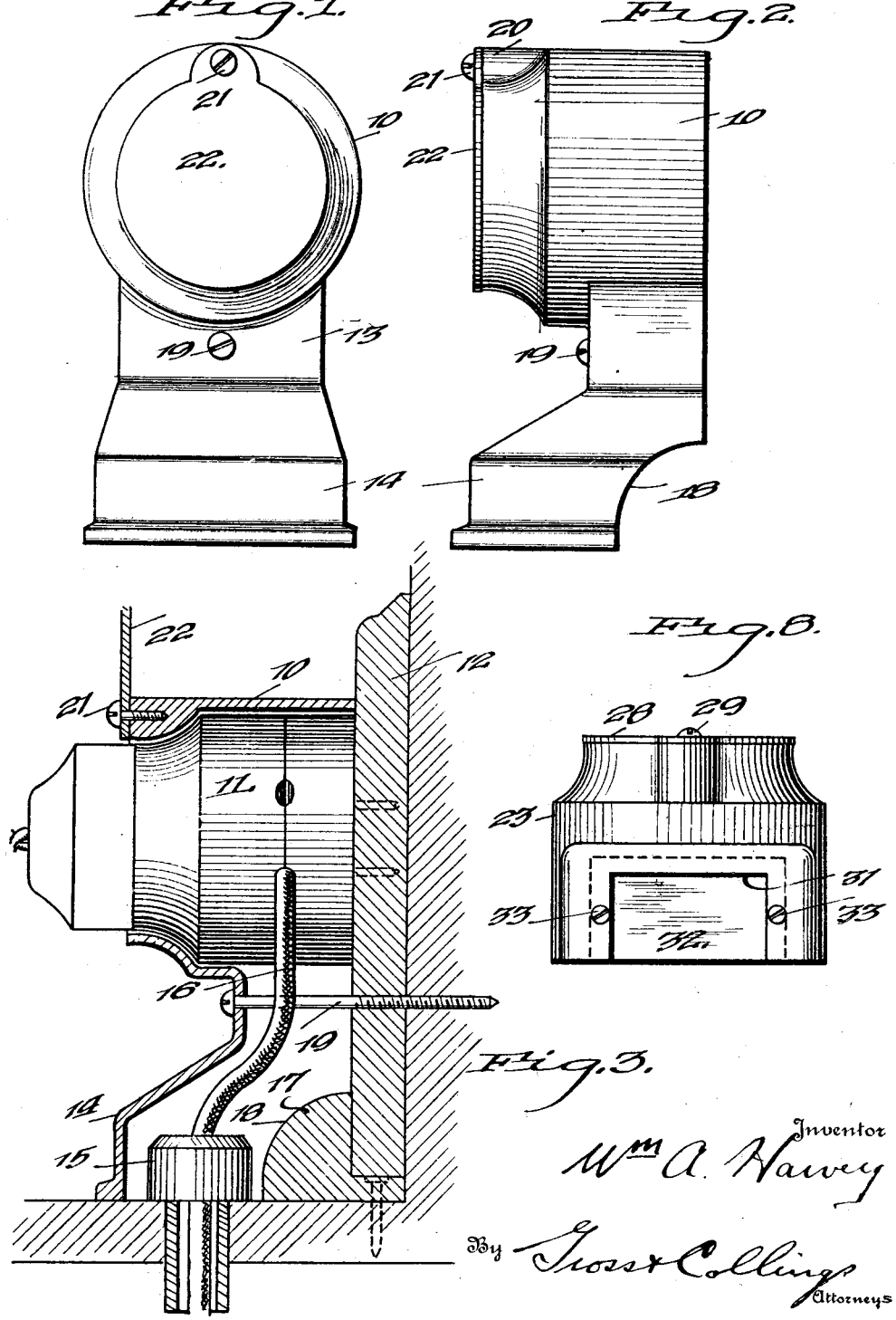

March 24, 1925.

W. A. HARVEY

HOUSING FOR RECEPTACLES FOR SURFACE MOUNTING

Filed Dec. 8, 1922

Inventor
Wm A Harvey
By Grist Collings
Attorneys

Patented Mar. 24, 1925.

1,530,828

UNITED STATES PATENT OFFICE.

WILLIAM A. HARVEY, OF SCRANTON, PENNSYLVANIA.

HOUSING FOR RECEPTACLES FOR SURFACE MOUNTING.

Application filed December 8, 1922. Serial No. 605,665.

*To all whom it may concern:*

Be it known that I, WILLIAM A. HARVEY, a citizen of the United States, residing at Scranton, in the county of Lackawanna and State of Pennsylvania, have invented certain new and useful Improvements in Housings for Receptacles for Surface Mounting, of which the following is a specification.

This invention relates to housings for receptacles for surface mounting, and has for its particular object to provide a cheap, efficient and acceptable means of installing surface type receptacles in electric lighting systems.

Where buildings are wired for electricity during their construction, flush type outlet boxes may be conveniently disposed at the desired places, and the wiring extended through the walls and floors accordingly. However, after the building of a house has been completed, it is difficult and expensive to install outlet boxes, considerable time being employed in cutting into the wall to provide a housing for the outlet boxes. Ofttimes solid walls, braces, or joists are encountered, thus making it a laborious and expensive undertaking to recess the wall for the reception of the outlet boxes.

Furthermore, these wall connections are ofttimes concealed by furniture or the like, or are installed in rooms where it is not necessary to maintain the finished appearance obtained by the use of flush type outlet boxes, and in these instances it is highly desirable to provide means whereby surface type receptacles can be employed, provision being made to make them conform to the laws regarding electric installments, and conformable with the requirements of the insurance underwriters. In this connection it should be noted that the insurance underwriters require surface receptacles to be protected when installed adjacent the floor.

It is therefore the object of my invention to provide a simple housing which may be employed for protecting surface receptacles, and which will not only present a finished and unobjectionable appearance, but will furthermore meet entirely with the requirements of the insurance underwriters.

My invention therefore consists in the novel construction of my improved housing wherein the advantages mentioned are obtained, all of which will be made more apparent as the description proceeds, especially when considered in connection with the accompanying drawings, wherein;

Figure 1 is a front elevation of a housing constructed in accordance with my invention;

Fig. 2 is a side elevation of the structure illustrated in Fig. 1;

Fig. 3 is a vertical sectional view through the structure illustrated in Fig. 1, the same being shown in use;

Fig. 8 is an end elevation of the structure illustrated in Fig. 7.

Figure 4:
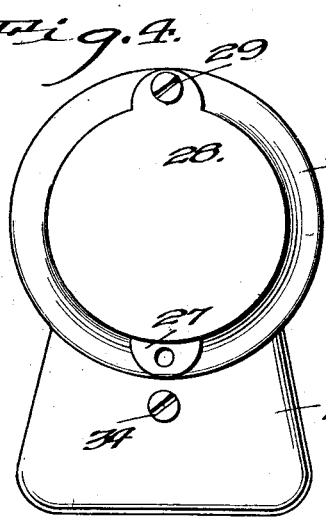
Fig. 4 is a front elevation of a slightly modified form of construction.

Referring now to the drawings, and more particularly to Figs. 1 to 3, the first form of my invention will be described. This form of the invention is designed to be attached to the baseboard to house a receptacle attached thereto and to protect the wires projecting upwardly through the floor. The housing is shaped to provide a circular compartment or section 10, adapted to receive a surface receptacle 11, which will be secured to the baseboard 12 in the usual manner. In practice the section or compartment 10 will be of sufficient size to receive the receptacle 11 with but a small amount of clearance. The circular portion of the housing merges into a substantially straight section 13, the walls of the housing thereafter being inclined outwardly and tapered to form an enlarged base 14. The width of the base 14 is sufficient to receive, with but a slight amount of play, the pair of porcelain tubes 15, through which the wires extend. The wires 16 are brought up through the housing, whereupon connection is made in the usual manner with the receptacle 11.

Baseboards are usually provided with strips of moulding 17, for covering the joint between the baseboard and the flooring, and for the accommodation of this moulding the base 14 of the housing is preferably cut away as indicated at 18. The portion of the housing intermediate the receptacle receiving compartment 10 and the base 14 is apertured to permit the passage of a screw 19, which extends through the baseboard 12 and into the wall for securely positioning the housing. A rigid mounting of the housing is assured, even though only one screw is employed, because the base 14 rests firmly upon the floor, while the rear face of the housing snugly engages the baseboard and the moulding 17. Furthermore, the receptacle receiving compartment and the base have but a very slight clearance with respect to the parts which they house.

When receptacles adapted to receive push plugs are employed it becomes unnecessary to provide a cover for the receptacle receiving compartment. However, in instances where receptacles adapted to receive screw plugs are employed it is considered advisable and good practice to provide a cover, and to this end I form, adjacent the top of the housing 10, an apertured stud 20, adapted to receive a pivot screw 21, which supports a cover 22. The pivot joint is disposed adjacent the top so that the cover 22 will close by gravity, and in this manner a satisfactory and acceptable housing for the purpose described is provided.

Ofttimes the wires with which connections are to be made, are brought out through the baseboard, or through the wall, thus making it necessary to slightly modify the housing to accommodate connections of this type. In this connection reference is made to Figs. 4 and 5, wherein a housing having the receptacle receiving compartment 23, is illustrated, this compartment being precisely the same as the one illustrated in Figs. 1 to 3.

Formed with the receptacle receiving compartment is a base 24, which tapers outwardly and downwardly, and is provided with a closed bottom 25. In this form the base 24 of the housing is adapted to enclose the porcelain tubes 26 inserted through the wall, and through which the wires extend, the circular compartment 23 and the base 24 in this instance, also having just a slight clearance with reference to the parts which they enclose.

Figure 5:
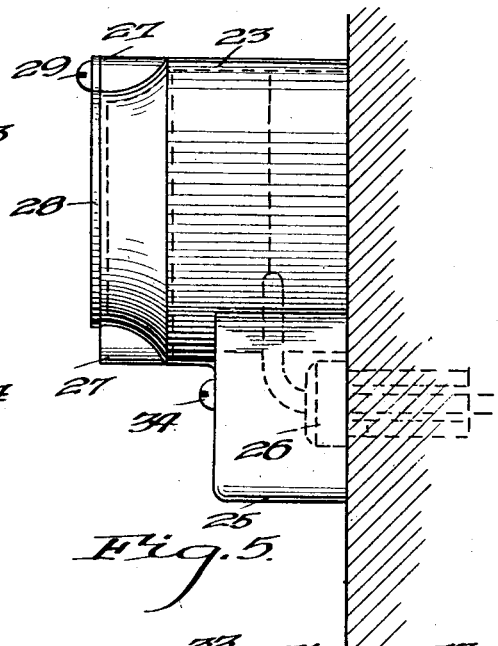
Fig. 5 is a side elevation of the structure illustrated in Fig. 4.

When connection is made with wires running upwardly, the housing is disposed in the position illustrated in Figs. 4 and 5. However, when connection is made with wires running downwardly, the position of the housing is reversed, so as to facilitate the connection. For accommodating the housing to these two uses, a pair of apertured studs 27 are provided, arranged diametrically opposite one another, and in a vertical plane. In this manner the cover 28 may be secured in place by the pivot screw 29 to either one or the other of the studs 27 so that the cover may close by gravity.

Figure 6:
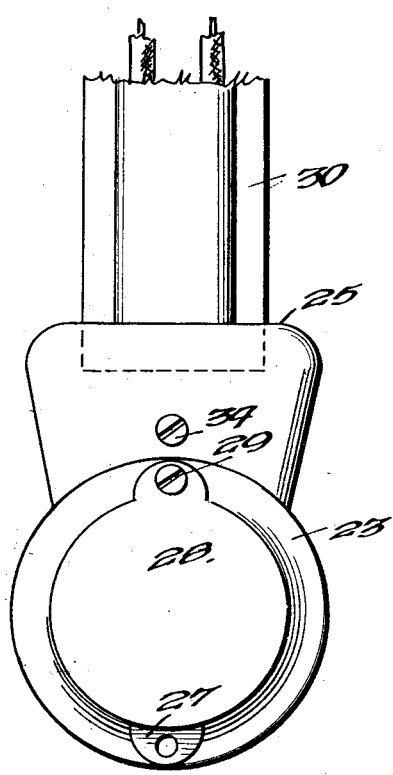
Fig. 6 is a view of a second modification.
Figure 7:
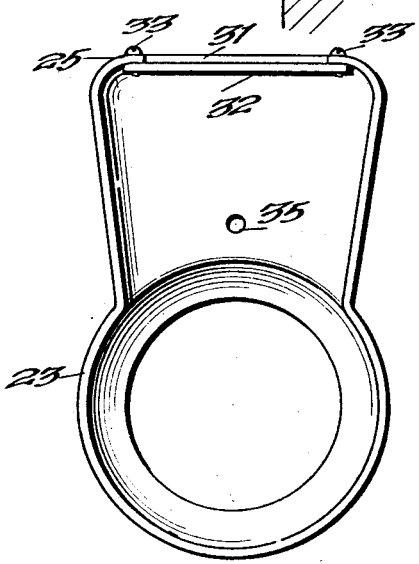
Fig. 7 is a rear elevation of the structure illustrated in Fig. 6.

Ofttimes it will be found desirable to employ the form of housing illustrated in Figs. 4 and 5, in connection with a moulding 30, through which the electric wires extend in surface wiring. To accommodate this the housing may be constructed in the manner illustrated in Figs. 6 to 8 inclusive, wherein the base 25 is cut away as at 31 sufficiently to receive the end of the moulding 30. For closing this opening when the housing is not employed in connection with moulding, but on the other hand is used as illustrated in Figs. 4 and 5, there is provided a cover plate 32, held in place by machine screws 33, which pass through the base of the housing and into the cover plate 32. In this manner the continuity of the housing may be retained when it is not used in connection with surface moulding, or the plate may be removed, thereby providing an entrance through which the end of a moulding may be inserted. In both of the modifications illustrated in Figs. 4 to 8 inclusive, the housing is secured in place by a screw 34, which passes through a relatively centrally disposed aperture 35, formed in the housing.

While in the several forms of housings illustrated herein I have shown doors associated therewith, it will be immediately apparent that this in nowise limits the scope of the invention, in as much as the doors may be omitted, particularly when the housings are employed with receptacles adapted to receive push plugs. In this instance the studs from which the doors are suspended may also be omitted.

From the foregoing it will be immediately apparent to those skilled in this particular art that I have provided a cheap, efficient and acceptable means for employing surface receptacles where heretofore flush type outlet boxes were necessary. The arrangement is such that the receptacle may be fully protected in a manner acceptable to the insurance underwriters and the necessity for flush type outlet boxes in many instances eliminated. The invention as modified, adapts itself for use either in connection with receptacles mounted on the baseboard or on the wall, and has provision also for accommodating moulding.

Obvious modifications with reference to shape and proportions may suggest themselves, and to this end reservation is made to make such changes as may come within the purview of the accompanying claims.

Having thus described my invention, what is claimed is:

1. A housing for receptacles for surface mounting comprising a receptacle receiving section, the walls of said housing tapering outwardly to form a base for receiving the wires and insulating tubes leading to the receptacle, said housing engaging a wall or the like and apertured to receive a screw for securing the same in place and a cover pivoted to said housing to close said receptacle receiving section.

2. The combination with a receptacle for surface mounting and electric wires with insulating tubes of a housing therefor adapted to be secured against a wall or the like, said housing being shaped to form a receptacle receiving compartment, and a tapered base for enclosing said wires and tubes.

3. The combination with a receptacle for surface mounting and electric wires with insulating tubes of a housing therefor adapted to be secured against a wall or the like, said housing being shaped to form a circular receptacle receiving compartment, a cover plate for closing the exposed side of said receptacle receiving compartment, and a tapered base for enclosing said wires and tubes.

4. The combination with a receptacle for surface mounting and electric wires and moulding of a housing, said housing being shaped to form a circular receptacle receiving section and a tapered base for receiving said wires, said base being cut away to accommodate the end of said moulding and a cover plate for closing said cut away portion, as and for the purpose set forth.

In testimony whereof I affix my signature.

WILLIAM A. HARVEY.